United States Patent
Takala et al.

(10) Patent No.: US 9,155,068 B2
(45) Date of Patent: Oct. 6, 2015

(54) METHOD AND APPARATUS FOR DELIVERING ADVERTISING DATA

(75) Inventors: Jari Aarno Tapani Takala, Espoo (FI); Evgeny Berezin, Helsinki (FI); Kimmo Kangas, Kerava (FI)

(73) Assignee: NOKIA TECHNOLOGIES OY, Espoo (FI)

(*) Notice: Subject to any disclaimer, the term of this patent is extended or adjusted under 35 U.S.C. 154(b) by 1597 days.

(21) Appl. No.: 12/397,238

(22) Filed: Mar. 3, 2009

(65) Prior Publication Data
US 2010/0227630 A1 Sep. 9, 2010

(51) Int. Cl.
| | |
|---|---|
| H04M 3/42 | (2006.01) |
| H04M 3/493 | (2006.01) |
| H04L 29/06 | (2006.01) |
| H04L 29/08 | (2006.01) |
| H04W 4/00 | (2009.01) |
| G06F 15/16 | (2006.01) |
| G06Q 30/00 | (2012.01) |
| H04W 72/00 | (2009.01) |
| G06Q 30/02 | (2012.01) |
| H04L 12/58 | (2006.01) |

(52) U.S. Cl.
CPC ......... *H04W 72/005* (2013.01); *G06Q 30/0276* (2013.01); *H04L 12/5895* (2013.01); *H04L 51/38* (2013.01); *H04L 12/583* (2013.01); *H04L 51/063* (2013.01)

(58) Field of Classification Search
CPC ......... H04W 4/14; H04W 4/12; H04W 76/04; G06Q 30/0276
USPC ........... 455/414.1–414.4, 466; 709/201–203; 705/14.72
See application file for complete search history.

(56) References Cited

U.S. PATENT DOCUMENTS

| | | | |
|---|---|---|---|
| 6,892,217 B1 * | 5/2005 | Hanmann et al. | 709/200 |
| 7,007,064 B2 | 2/2006 | Faris | |
| 7,113,774 B2 | 9/2006 | Kim et al. | |
| 2003/0112789 A1 * | 6/2003 | Heinonen et al. | 370/349 |
| 2004/0205564 A1 * | 10/2004 | Brayton et al. | 715/513 |
| 2006/0015626 A1 | 1/2006 | Hallamaa et al. | |
| 2006/0294258 A1 | 12/2006 | Powers-Boyle et al. | |
| 2007/0016636 A1 * | 1/2007 | Boerries et al. | 709/200 |
| 2007/0038717 A1 | 2/2007 | Burkholder et al. | |
| 2007/0136533 A1 * | 6/2007 | Church et al. | 711/137 |
| 2007/0220550 A1 | 9/2007 | Ljungman et al. | |
| 2009/0005019 A1 * | 1/2009 | Patel et al. | 455/414.2 |
| 2009/0037948 A1 | 2/2009 | Hostyn | |

OTHER PUBLICATIONS

"Screensavers from i2Eye Infotech" http://i2eye.co.in/Screensavers.html, accessed Jun. 3, 2009.

* cited by examiner

*Primary Examiner* — Dung Hong
(74) *Attorney, Agent, or Firm* — Ditthavong & Steiner, P.C.

(57) ABSTRACT

An approach is provided for delivering advertising data. An advertising platform separates advertising data into a heavy component and a light component. The heavy component and the light component are delivered to a user equipment independently of each other by pre-loading and/or downloading the content. A trigger then causes the user equipment to compile the advertising data into an advertisement.

20 Claims, 10 Drawing Sheets

METHOD AND APPARATUS FOR DELIVERING ADVERTISING DATA

BACKGROUND

Wireless (e.g., cellular) service providers and device manufacturers are continually challenged to deliver value and convenience to consumers by, for example, providing compelling network services, applications, and content. One area of development is the delivery of mobile advertising, particularly in light of the increasing availability of mobile devices with greater processing capability, enhanced graphics, and increased memory. These mobile devices offer the possibility of providing mobile advertisements with rich content to attract consumers. However, limited resources (e.g., bandwidth) within the wireless environment pose significant challenges to delivering mobile advertisements containing rich content.

SOME EXEMPLARY EMBODIMENTS

Therefore, there is a need for an approach for efficiently delivering rich advertising data.

According to one embodiment, an apparatus comprising a processor and a memory storing executable instructions that if executed cause the apparatus to initiate delivery of a heavy component of advertising data to a user equipment. The advertising data includes a light component. The processor and the memory are also caused to initiate delivery of the light component to the user equipment independently of the heavy component. The advertising data further has been separated into the heavy component and the light component based on predetermined criteria.

According to another embodiment, a method comprises providing access for delivery of a heavy component and a light component of advertising data independently of each other.

According to another embodiment, a computer-readable storage medium carrying one or more sequences of one or more instructions which, when executed by one or more processors, cause the one or more processors to receiving delivery of a heavy component and a light component of advertising data independently of each other. The advertising data has been separated into the heavy component and the light component based on predetermined criteria.

According to yet another embodiment, an apparatus comprising a processor and a memory storing executable instructions that if executed cause the apparatus to receive delivery of a heavy component and a light component of advertising data independently of each other. The advertising data has been separated into the heavy component and the light component based on predetermined criteria. The delivery of the advertising data is either by pre-loading the advertising data prior to sale or downloading the advertising data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for delivering advertising data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various exemplary embodiments are described with respect to delivering advertising data within a wireless network environment, it is contemplated that the approach for delivering advertising data described herein may be used within any type of communication system or network.

Figure 1:
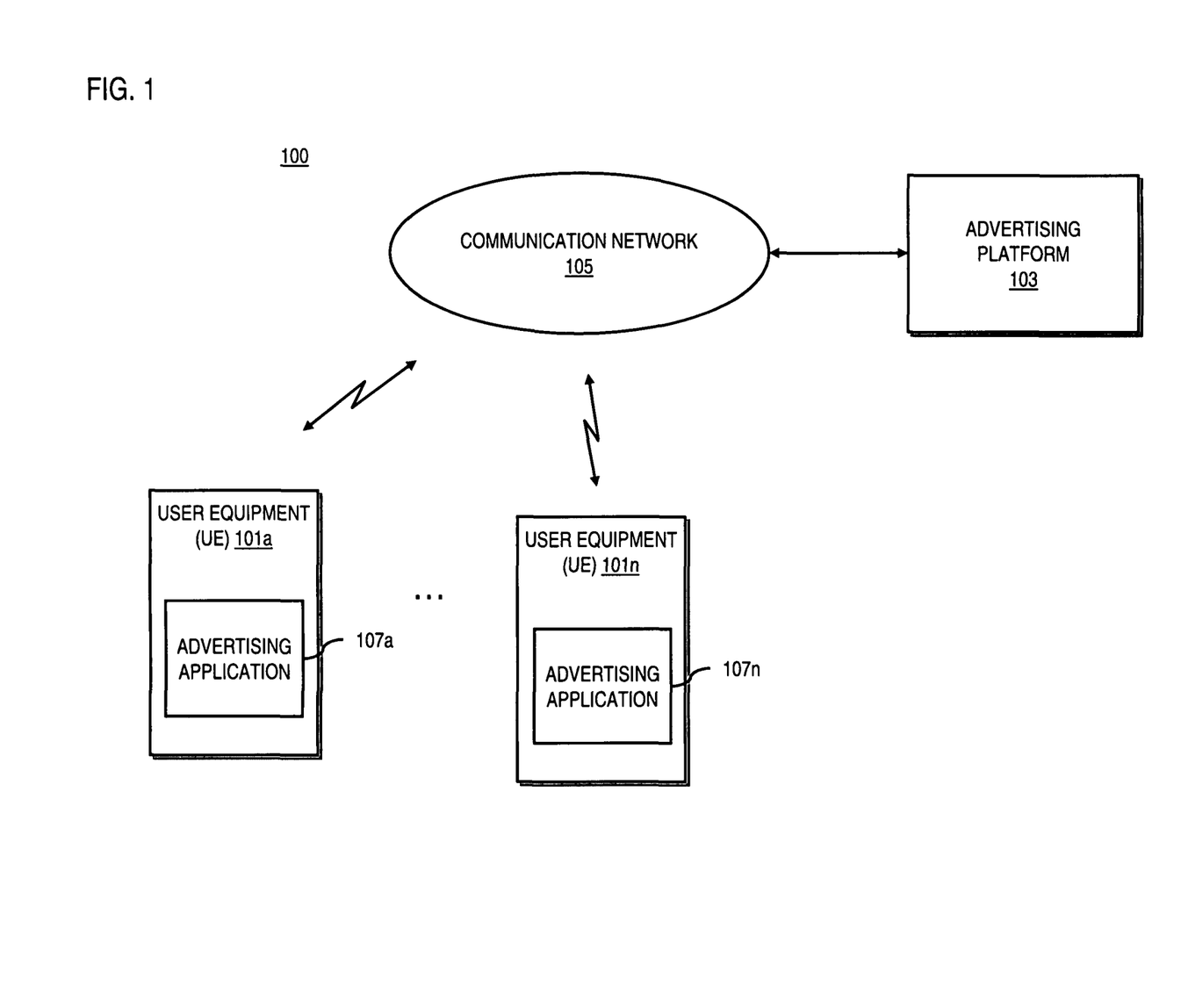
FIG. 1 is a diagram of a communication system capable of delivering advertising data, according to an exemplary embodiment.

FIG. 1 is a diagram of a communication system capable of delivering advertising data, according to an exemplary embodiment. As shown in FIG. 1, a system 100 comprises one or more user equipment (UEs) (e.g., UEs 101a-101n) having connectivity to an advertising platform 103 via a communication network 105. The UEs 101a-101n are any type of mobile terminal, fixed terminal, or portable terminal including mobile handsets, stations, units, devices, multimedia tablets, Internet nodes, communicators, desktop computers, laptop computers, Personal Digital Assistants (PDAs), or any combination thereof. It is also contemplated that the UEs 101a-101n can support any type of interface to the user (such as "wearable" circuitry, etc.). In exemplary embodiments, the advertising platform 103 enables the delivery of advertising data to the UEs 101a-101n.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

As discussed previously, delivering rich advertisements (i.e., advertisements containing rich content such as video, audio, multimedia, etc.) within a wireless environment taxes the limited resources (e.g., bandwidth) that are available within the environment. For example, delivery of rich advertisements to a mobile device can often be slow and time consuming because of the limited bandwidth available in many networks. Delivery of rich advertisements can also be costly to the consumer especially when the consumer pays for data usage on the network. Consequently, mobile advertisements have mostly been limited to simple banners, thereby also limiting the effectiveness of the advertisements.

The system 100 addresses this problem by separating the advertising data into a heavy component and a light component based on predetermined criteria (e.g., file size, frequency of change, customizability) and delivering the heavy component and the light components independently from each other. In exemplary embodiments, the heavy component includes, for instance, rich content (e.g., audio, video, multimedia, images, etc.) that require relatively more network resources than the light component to transmit from the advertising platform 103 to the UEs 101a-101n. The light component, for instance, includes informative data (e.g., descriptive text, pricing information, effective dates, etc.) associated with an advertisement.

The separation of advertising data into the two components enables the advertising platform 103 to efficiently deliver the advertising data to the UE 101 by enabling the advertising platform 103 to select different delivery methods for the heavy component and the light component. For example, the separation of the advertising data enables the advertising platform 103 pre-load the heavy component into the UE 101 prior to sale of the UE 101 so that the heavy component would already be on the UE 101 and ready to use when the UE 101 enters service. In this way, only a small amount of information (e.g., the light component) is transmitted to the UE 101 to present a rich advertisement on the UE 101. In exemplary embodiments, the advertising platform 103 can also be configured to deliver the advertising data (e.g., the heavy component, the light component, or both) by downloading the advertising data as needed. In this case, the UE 101 can be configured to download the advertising data when the UE 101 is connected to the advertising platform 103 over a less expensive data network (e.g., a wireless local area network (WLAN)) or when network access fees are reduced or eliminated. In this way, the system 100 reduces the need for potentially resource-intensive and costly downloads to present rich advertisements on the UE 101.

As shown in FIG. 1, the UEs 101a-101n each include, for instance, an advertising application 107 to coordinate the delivery, compilation, and presentation of the advertising data from the advertising platform 103. In exemplary embodiments, the advertising application 107 receives and stores the advertising data (i.e., the heavy component and the light component) from the advertising platform 103. The advertising platform 103 can then trigger the advertising application 107 to compile the heavy component and the light component of the advertising data into an advertisement for presentation on the UE 101. In exemplary embodiments, it is contemplated that the advertising platform 103 can use any mechanism to trigger the compilation of the advertisement. For example, the trigger can be the delivery of the light component of the advertising data to the UE 101, a separate triggering message, or a request from the user.

By way of example, the UEs 101a-101n communicate with the advertising platform 103 over the communication network 105 using standard protocols. The UEs 101a-101n and the advertising platform 103 are network nodes with respect to the communication network 105. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled "Interconnections Second Edition," by Radia Perlman, published September 1999.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
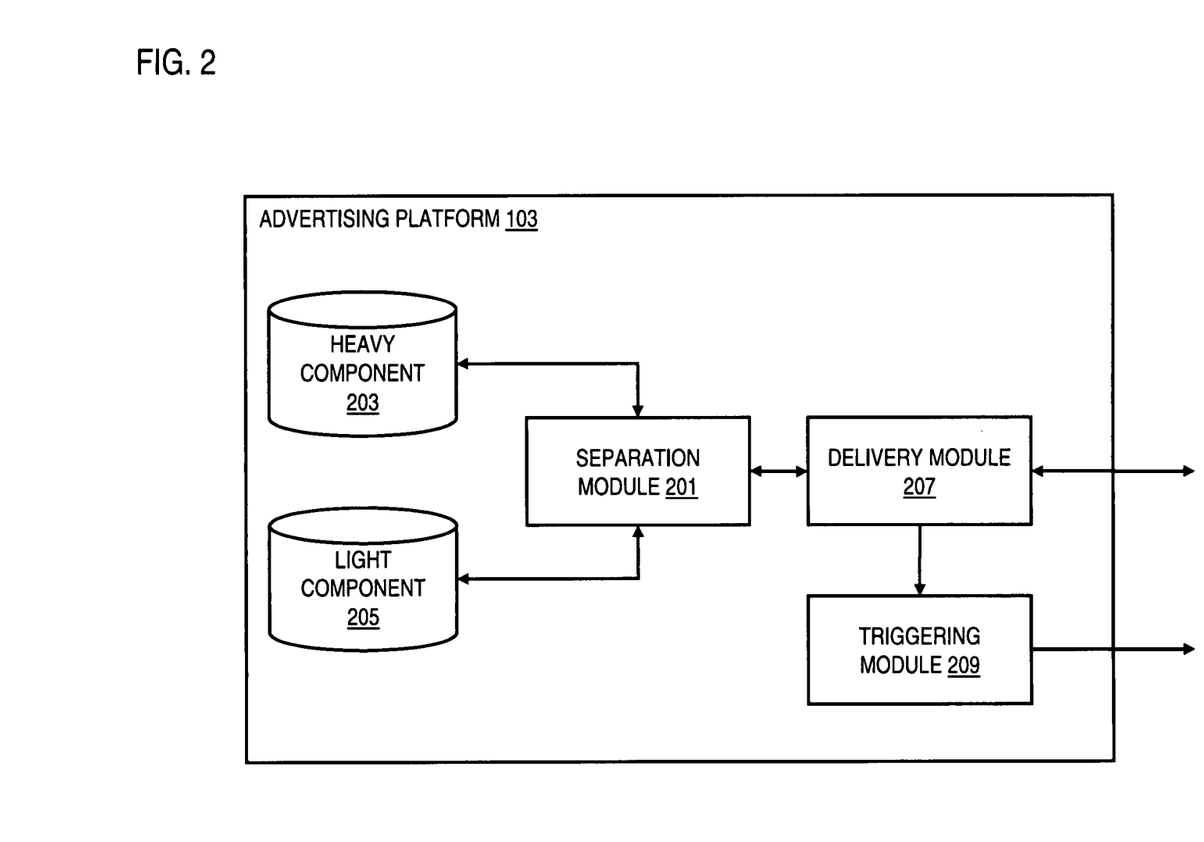
FIG. 2 is a diagram of components of an advertising platform, according to an exemplary embodiment.

FIG. 2 is a diagram of components of an advertising platform, according to an exemplary embodiment. By way of example, the advertising platform 103 includes one or more components for delivering advertising data. It is contemplated that the functions of these components may be combined in one or more components or performed by other components of equivalent functionality. In this embodiment, the advertising platform 103 includes a separation module 201 for separating advertising data into a heavy component and a light component. The heavy component of the advertising data is stored in a database 203, and the light component is stored in a database 205. As discussed with respect to FIG. 1, advertising data is separated into the two components to facilitate efficient delivery to the UEs 101a-101n. The separation module 201, for instance, performs the separation based on predetermined criteria.

For example, the predetermined criteria include file size, frequency of change, reusability, customizability, or any combination thereof. With respect to file size, for instance, advertising data that have a larger file size (e.g., video, audio, multimedia) may be classified as a heavy component, and advertising data with a smaller file size (e.g., descriptive or informative text) may be classified as a light component. With respect to frequency of change, advertising data that is relatively static (e.g., background images, audio, and video) may be classified as a heavy component, and advertising data that changes frequently (e.g., movie time tables) may be classified as a light component. With respect to reusability, advertising data that can be reused in multiple advertisements (e.g., images of a company logo, background images) can be classified as a heavy component, and advertising data that is specific to a particular advertisement (e.g., effective date or terms) can be classified as a light component. With respect to customizability, advertising data that is not easily customizable or is not designed to by customizable (e.g., stock images) can be classified as heavy content, and advertising data that is customizable (e.g., personalized messages) can be classified as light content. It is contemplated that the classification decision point (i.e., the criteria value used to classify advertising data as either a heavy component or a light component) can be configured independently for each predetermined criterion. It is also contemplated that the separation process can occur through automated processes or through manual processes.

As shown in FIG. 2, the separation module 201 also has connectivity to a delivery module 207. In exemplary embodiments, the delivery module 207 coordinates the delivery of advertising data to the UEs 101a-101n by designating how the heavy component and light component of the advertising data are to be delivered. In exemplary embodiments, the heavy component and the light component are delivered to the UEs 101a-101n independently of each other by either pre-loading the advertising data into the UE 101 (e.g., at the factory or prior to sale) or downloading the advertising data to the UE 101 as needed. As previously discussed, the UE 101 can be configured to download the advertising data when connected to a local area network (e.g., a WLAN) or when network access fees are reduced or eliminated. It is contemplated that the delivery module 207 can employ pre-loading, downloading, or a combination of both on either the heavy component or light component of the advertising data.

In addition, the delivery module 207 coordinates the delivery of any updated advertising data to the UEs 101a-101n. In exemplary embodiments, the heavy component and the light component of advertising data may be updated independently and then delivered independently to the UEs 101a-101n. In this way, the delivery module 207 delivers only the portion of the advertising data that has been updated, thereby making more efficient use of network resources.

The delivery module 207 interacts with a triggering module 209 to cause the UEs 101a-101n to compile the advertising data (i.e., the heavy component and the light component) into an advertisement. As discussed previously, the triggering module 209 can use any mechanism to trigger the compilation of the advertisement by the UE 101. For example, the trigger can be the delivery of the light component of the advertising data to the UE 101, a separate triggering message, or a request from the user.

Figure 3:
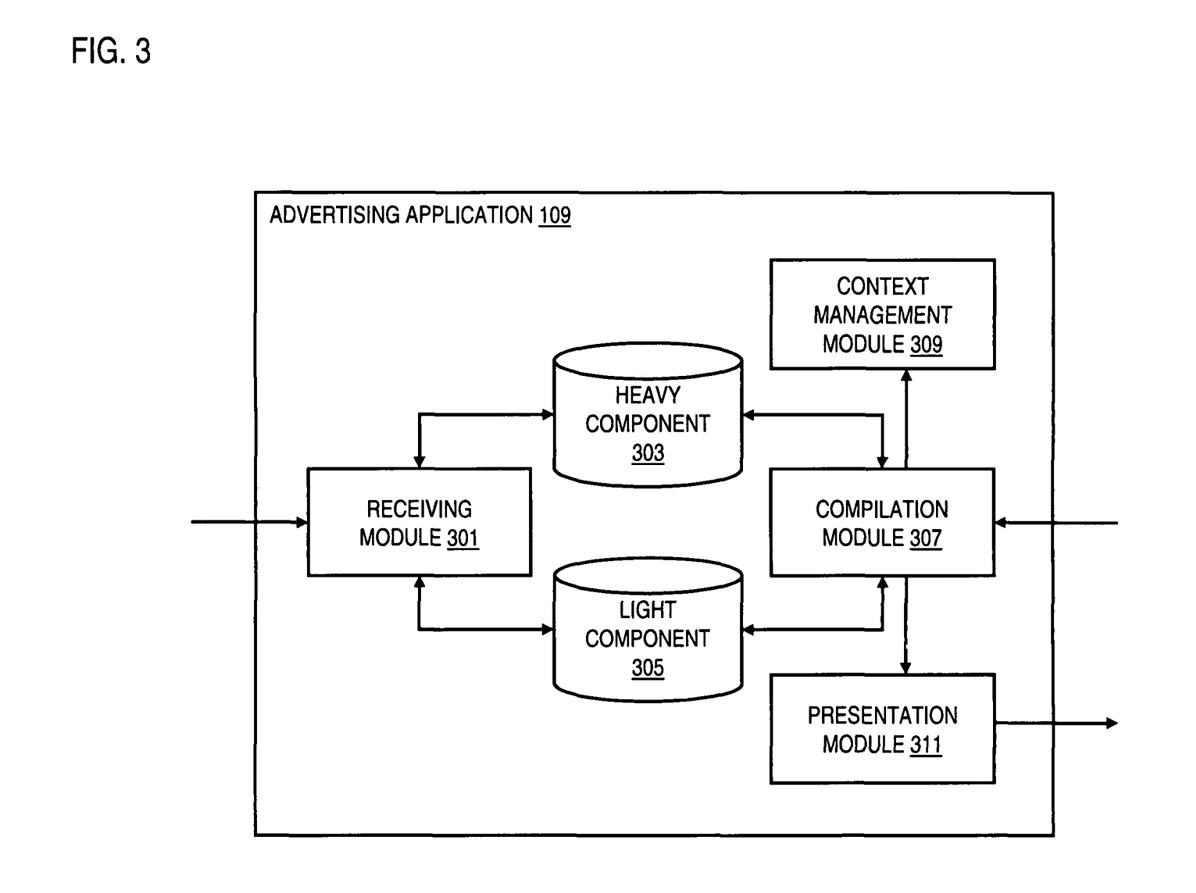
FIG. 3 is a diagram of components of an advertising application, according to an exemplary embodiment.

FIG. 3 is a diagram of components of an advertising application, according to an exemplary embodiment. By way of example, the advertising application 107 includes one or more components for receiving, compiling, and presenting advertising data. It is contemplated that the functions of these components may be combined in one or more components or performed by other components of equivalent functionality.

In exemplary embodiments, the advertising application 107 includes a receiving module 301 for independently receiving the heavy component and the light component of advertising data. The heavy component is stored in a database 303, and the light component in a database 305. In certain embodiments, either all or a portion of the heavy component, the light component, or both may be pre-loaded into the respective databases 303 and 305. For instance, the pre-loading of the data may occur before sale of the UE 101 containing the advertising application 107. In this case, the receiving module 301 can coordinate the delivery of additional (if any) advertising data with the pre-loaded data.

In exemplary embodiments, the delivery of advertising data that has not been pre-loaded is by downloading of the advertising data over the communication network 105. The receiving module 301 can be further configured to download the content, for instance, when the UE 101 is connected to a fast network (e.g., a local area network or WLAN) or when the network access fees are reduced or eliminated. This enables the system 100 to deliver advertising data to the UE 101 while reducing network usage and/or cost. In addition to downloading advertising data over the communication network 105, it is contemplated that other mechanisms for transporting data from the advertising platform 103 to the UE 101 may be used (e.g., physical transfer of the advertising data using a portable storage medium such as flash memory or other memory storage, or transfer using short range radio technology such as Bluetooth®).

The receiving module 301 also receives and manages updates to the advertising data already stored in the databases 303 and 305. On receipt of either an updated heavy component or an updated light component, the receiving module 301, for instance, identifies and replaces the updated advertising data into the respective databases 303 and 305. In exemplary embodiments, receipt of the updated heavy component or the updated light component is generally by downloading from, for instance, the advertising platform 103. The updated advertising data may also be received using other mechanisms such as the portable storage medium or the short range radio technology discussed above.

The advertising application 107 also includes a compilation module 307 for receiving a trigger from the advertising platform 103 to compile the heavy component and the light component of the advertising data into an advertisement. The trigger, for example, can be by any suitable mechanism including the delivery of the light component of the advertising data to the UE 101, a separate triggering message, or a request from the user. On receipt of the trigger, the compilation module 307 retrieves a template from either the heavy component or the light component of the advertising data for compiling the advertisement. By way of example, the template guides how the heavy and light components are to be compiled into an advertisement. For example, the template includes information on positioning and characteristics of various elements of the advertisement including font size, typeface, alignment, color, etc. The template may also specify the timing for presentation of various components or elements of advertisement. For instance, components of the advertisement may appear simultaneous, sequentially, at specific times, or any combination thereof. Moreover, the template be dynamic, thereby enabling the compilation module 307 to use components differently when compiling the advertisement (e.g., with varying amount of components or elements. The template may also contain several levels to allow components of an advertisement to be composed of other sub-components.

In exemplary, embodiments the advertising data may be context aware with respect to, for example, location, time, or both. If the advertising data is context aware, the compilation module 307 interacts with a context management module 309 to determine the context (e.g., location, time) and to select the elements of the advertising data that correspond to the determined context. For instance, the context management module 309 interfaces with various components of the UE 101 (e.g., a global positioning satellite (GPS) receiver, clock, etc.) to assist in determining the context. It is contemplated that the context may be determined using any sensor (e.g., light sensors, accelerometers, temperature) available to the UE 101.

After compiling the advertisement according to the template and context (if applicable), the compilation module 307 interacts with the presentation module 311 to present the advertisement on the UE 101. Depending on the elements (e.g., audio, video, images, and text) incorporated in the compiled advertisement, presentation module 311 directs the audio and video circuitry of the UE 101 to display the advertisement.

Figure 4:
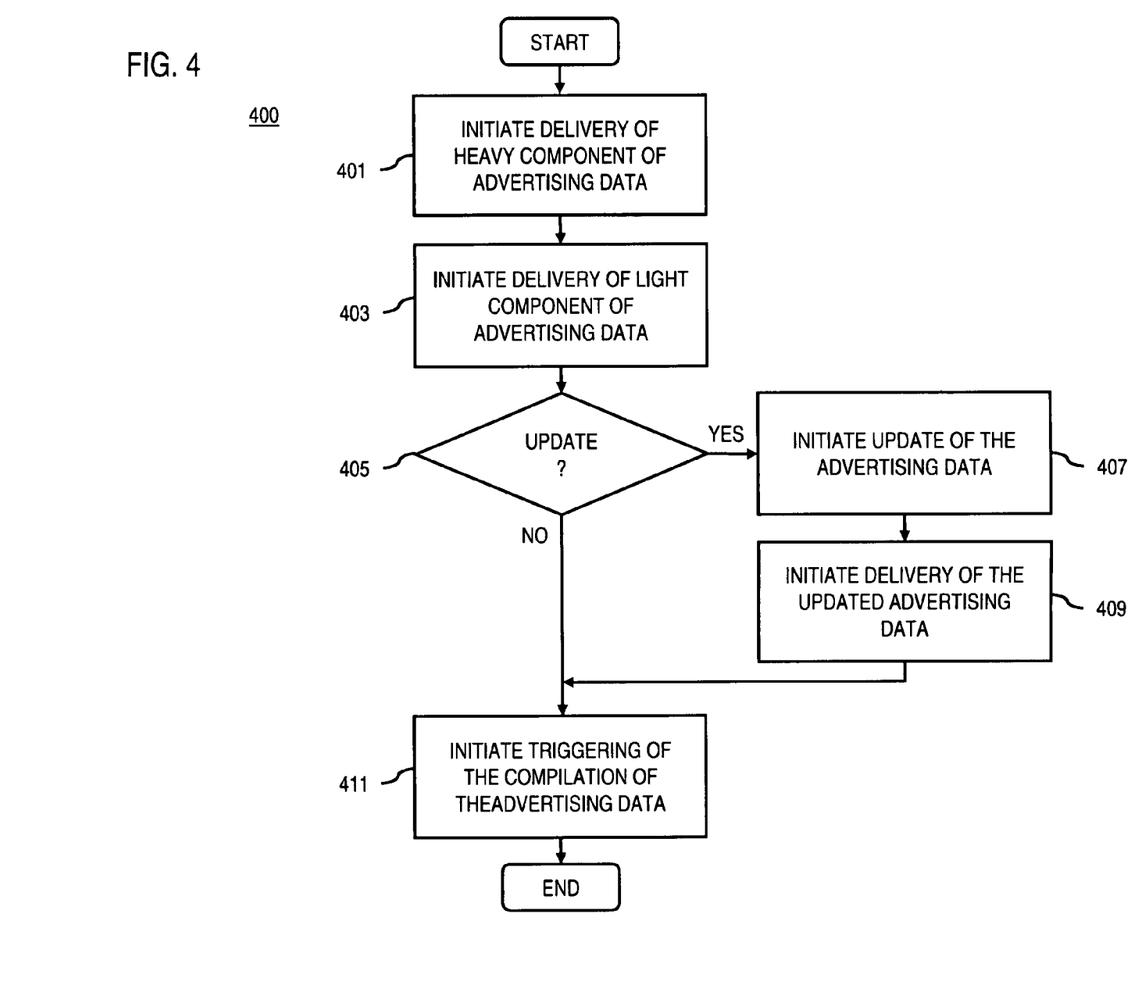
FIG. 4 is a flowchart of a process for delivering advertising data, according to an exemplary embodiment.
Figure 9:
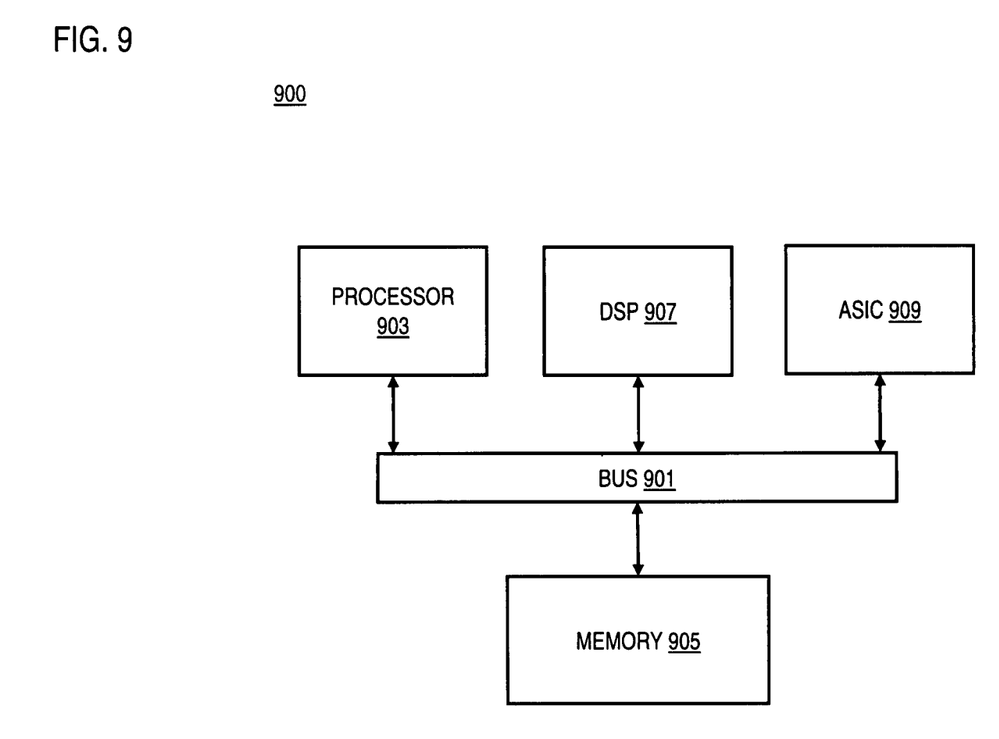
FIG. 9 is a diagram of a chip set that can be used to implement an embodiment of the invention.

FIG. 4 is a flowchart of a process for delivering advertising data, according to an exemplary embodiment. In one embodiment, the advertising platform 103 performs the process 400 and is implemented in, for instance, a chip set including a processor and a memory as shown in FIG. 9. The process assumes that the advertising data to be delivered to the UE 101 has already been separated into a heavy component and a light component based on one or more of the predetermined criteria discussed previously. In step 401, the advertising platform 103 initiates delivery of the heavy component of the advertising data to the UE 101. In exemplary embodiments, the delivery of the heavy component is either by pre-loading the heavy component into the UE 101 prior to sale of the UE 101 or by downloading the heavy component to the UE 101 at a later point in time. In exemplary embodiments, pre-loading of the heavy component makes efficient use of network resources by bypassing the need to downloading the heavy component (e.g., content that requires relatively more resources to transport). However, when downloading is used to deliver the heavy component, the advertising platform 103 may nonetheless make more efficient use of network resources by scheduling the download when the UE is connected to a fast network (e.g., a local area network or a WLAN) or when network access fees are reduced or eliminated.

In step 403, the advertising platform 103 initiates delivery of the light component of the advertising data to the user equipment independently of the heavy component. As noted previously, independent delivery of the heavy component and the light component enables the advertising platform 103 to use the most efficient delivery method (e.g., pre-loading or downloading) for the specific component. For instance, in exemplary embodiments, the light component of the advertising data is generally smaller in file size and can be more easily and quickly transported over a wireless communication network 105. As a result, the advertising platform 103 may have more flexibility in when and how the light component is component is delivered to the UE 101. For example, although the light component can be pre-loaded into the UE 101 prior to sale, it may be more advantageous to deliver the light component at a later point in time to allow for customization and updates to the advertising data.

If there are updates to the advertising data (step 405), the advertising platform 103 initiates the update (step 407) and initiates delivery of the updated data to the UE 101 (step 409). It is contemplated that either the heavy component or the light component of the advertising data may be updated independently. In addition, it is contemplated that the update may be conducted using a multi-layered approach in which individual portions of each component of the advertising data may be updated independently, thereby enabling the advertising platform to deliver updates only for the specific portions of the advertising data that has actually changed. The step of updating includes, for instance, obtaining the updated data and replacing the updated data in the databases 203 and/or 205 of the advertising platform 103. The advertising platform 103 then initiates delivery of the updated advertising data to the UE 101 via, for example, downloading the updated data to the UE 101. Once the UE 101 has the advertising data, the advertising platform 103 can trigger the UE 101 to initiate compilation of the heavy component and the light component into an advertisement according to the process described with respect of FIG. 2 (step 411).

Figure 5:
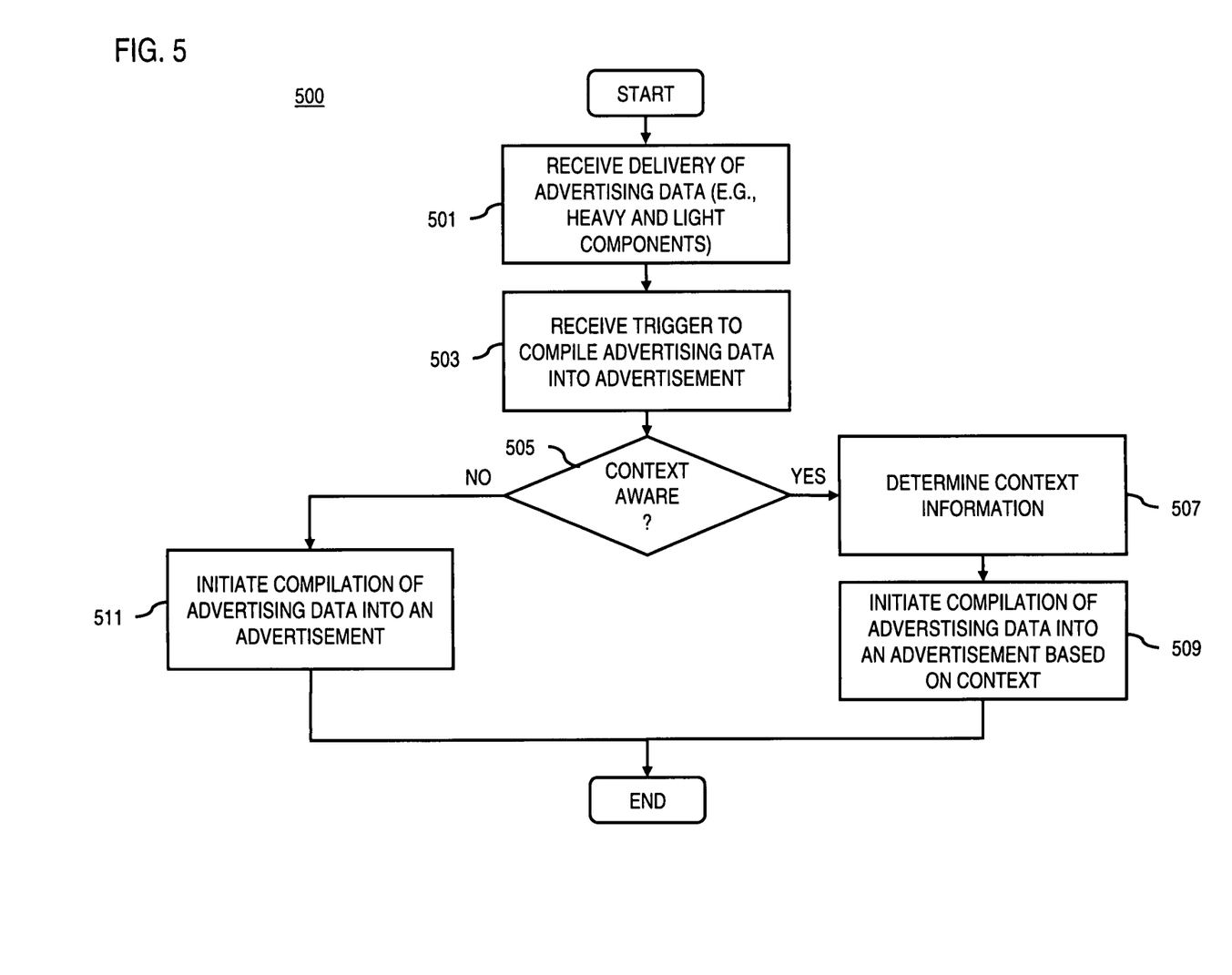
FIG. 5 is a flowchart of a process for receiving advertising data, according to an exemplary embodiment.

FIG. 5 is a flowchart of a process for receiving advertising data, according to an exemplary embodiment. In one embodiment, the advertising application 107 performs the process 500 and is implemented in, for instance, a chip set including a processor and a memory as shown in FIG. 9. In step 501, the advertising application 107 receives delivery of the heavy component and the light component of the advertising data. In exemplary embodiments, the advertising application 107 receives the two components independently of each other. As previously discussed, the heavy component and the light component may be delivered by either pre-loading the component into the UE 101 or downloading the component to the UE 101.

After receiving delivery of the advertising data, the advertising application 107 receives a trigger to initiate compilation of the advertising data into an advertisement (step 503). On receiving the trigger, the advertising application 107 begins the advertisement compilation process by determining whether the advertising data is context aware (i.e., contains advertising data that is specific to a particular context such as location or time) (step 505). If the advertising data does contain context aware information, the advertising application 107 determines the context state (e.g., location or time) of the UE 101 (step 507). For example, the advertising application 107 can interface with the sensors available to the UE 101 (e.g., GPS, clock, etc.) to determine the context. Next, the advertising application 107 initiates compilation of the advertising data into an advertisement using the determined context information (step 509). The compilation process includes retrieving a template for compiling the advertising data. In exemplary embodiments, the template can be included in either the heavy component, the light component, or both. It is also contemplated that the template may be transmitted separately, generated by the UE 101, or created using another appropriated mechanism. As previously discussed, the template provides a guide for how the heavy component and the light component are to be compiled (e.g., layout, fonts, color palette, timing of presentation of various components). In addition, the advertising application 107 may take into account personalized settings (e.g., language, themes, etc.) associated the UE 101 during the compilation process. In this way, the compiled advertisement may be personalized or customized according to user preferences.

If the advertising data does not contain context aware information, the advertising application 107 initiates compilation of the advertisement according to the template (step 511) without determining a context state of the UE 101. After compilation, the advertising application 107 presents the compiled advertisement on the UE 101.

By way of example, in one use case scenario, the advertising platform 103 processes advertising data for an advertisement for a film. In this case, the advertisement is movie trailer for the film with the heavy component comprising the video file of the movie trailer, and the light component comprising show times, theater locations, and language specific subtitles. Accordingly, the video file may be pre-loaded into the UE 101, thereby making the UE 101 ready to present the advertisement on receipt of the light component. The advertising platform 103 can then trigger the UE 101 to compile and present the film advertisement by transmitting the light component (e.g., show times, theater locations, and subtitles) to the UE 101. On receiving the trigger, the advertising application 107 within the UE 101 recognizes that the advertising data includes context aware information (e.g., show times and theater locations). Accordingly, the advertising application 107 determines the location of the UE 101 and time, and uses this information to select the appropriate context aware information (e.g., closest show times and theaters displaying the movie) to compile the advertisement. Additionally, the advertising application 107 can use the language settings of the UE 101 to select the correct language for the subtitles. The advertising application 107 then uses this information to compile and present the advertisement according to the context information and the associated template. In this case, the template directs where the advertising application 107 should overlay the subtitles, show times, and theater locations on the movie trailer.

In another use case scenario, the advertising platform 103 processes advertising data for an advertisement for a store catalog. In this case, the heavy component of the advertising data includes a branded image of the store and images of the catalog items. These images fit the predetermined criteria for classification as a heavy component. For instance, the branded image of the store and the images of the catalog items can be reused in multiple advertising campaigns involving the same store. The light component includes the price information associated with each item and the dates of sale offers. These are classified as the light component because they change frequently and are relatively small in size to transmit. Once the heavy component and light components are loaded into the UE 101, the advertising platform 103 can trigger the compilation and presentation of the advertisement on the UE 101. On receipt of the trigger, the advertising application 107 compiles the images (i.e., the heavy component) with the pricing and sale information (i.e., light component) to create the advertisement.

Figure 6A:
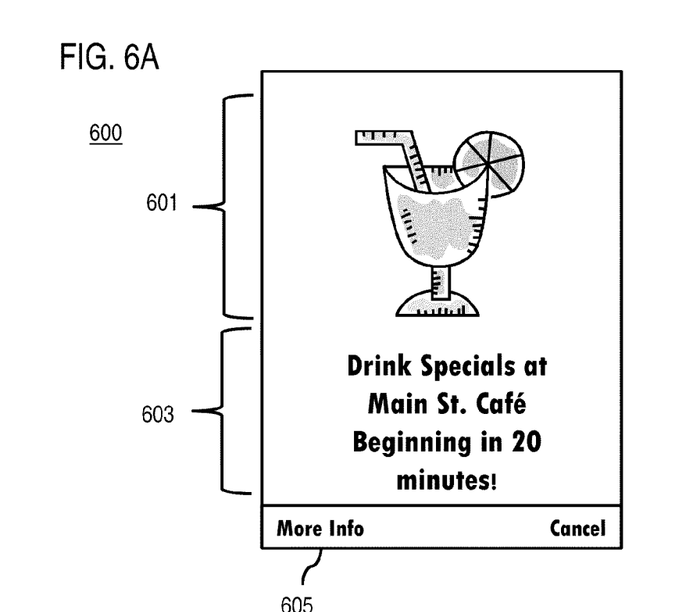
FIGS. 6A and 6B are diagrams of a user interface utilized in delivering advertising data to a user equipment, according to an exemplary embodiment.
Figure 6B:
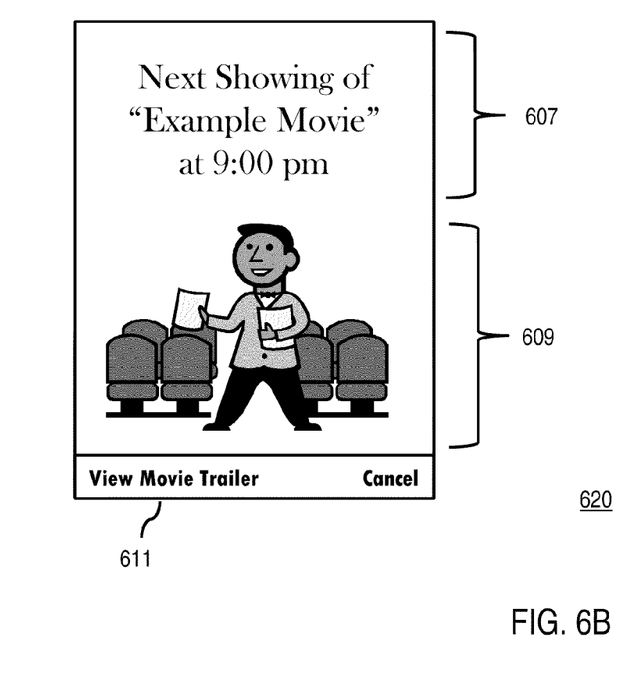

FIGS. 6A and 6B are diagrams of a user interface utilized in delivering advertising data to a user equipment, according to an exemplary embodiment. FIG. 6A depicts an example user interface 600 for a rich advertisement of a restaurant, with the advertisement containing context aware information based on time. The advertisement 600 includes a heavy content section 601 with a graphic or animation representing the restaurant and a light section 603 displaying context aware information (e.g., "Drink Specials at Main St. Café Beginning in 20 Minutes). The context information is represented in the time display (e.g., "20 minutes) and is configured to dynamically count down until the special has begun based on the time as determined by the UE 101. The user interface 600 provides an option 605 to obtain more information regarding the restaurant or information. Based on the approach to delivering advertising content described herein, the heavy content can be pre-loaded into the UE 101, while the light content can be transmitted to the UE 101 to initiate compilation and presentation of the rich advertisement 600.

Similarly, FIG. 6B depicts an example user interface 620 for a rich advertisement of a movie. The advertisement includes a light component 607 containing context aware information (e.g., movie start time) and a heavy component 609 containing a video of the movie trailer. The context information in the light component uses the clock of the UE 101 to determine the next showing of the advertised movie (e.g., "Example Movie"). This show time information is updated and transmitted to the UE 101 depending on when the advertisement is viewed on the UE 101. In this example, the user views the advertised movie trailer by selecting option 611.

Figure 7:
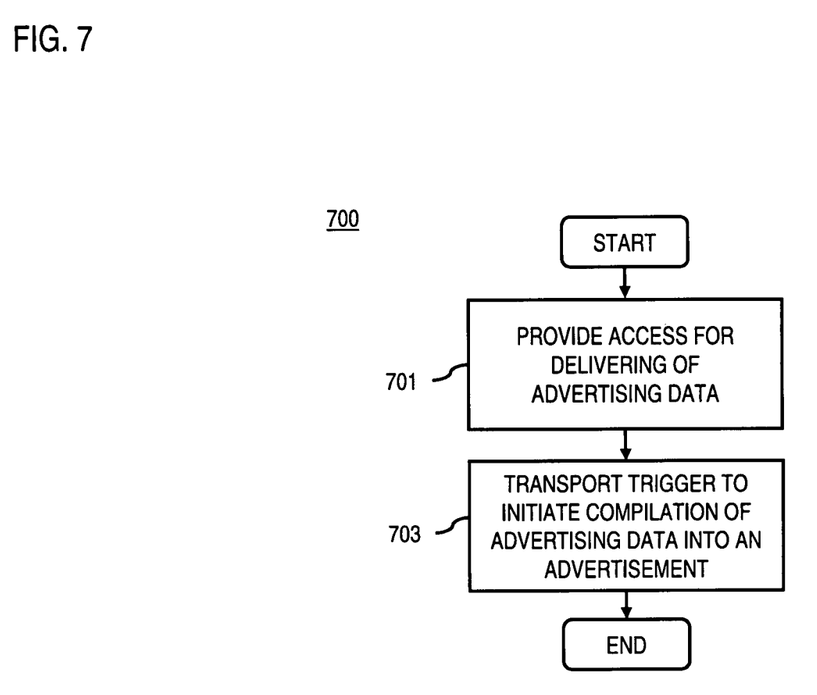
FIG. 7 is a flowchart of a process for delivering advertising data over a communication network, according to an exemplary embodiment.

FIG. 7 is a flowchart of a process for delivering advertising data over a communication network, according to an exemplary embodiment.

The described processes and arrangement advantageously, according to certain embodiments, provide for sharing of mobile web services. In step 701, the communication network 105 provides access to the advertising platform 103 and the advertising application 107 within the UE 101 for delivering advertising data. For example, providing access includes making network resources (e.g., bandwidth) available to the advertising platform 103 and the advertising application 107 to transport advertising data. It is also contemplated that the communication network 105 can use any authentication mechanism (e.g., user ID/password, device ID filtering, etc.) to ensure that the advertising platform 103 and the advertising application 107 are authorized to transport data across the network 105. The communication network 105 also provides access for transporting a trigger between the advertising platform 103 and the advertising application 107 to initiate compilation of the delivered advertising data in to a rich advertisement.

The processes described herein for providing delivering advertising data may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
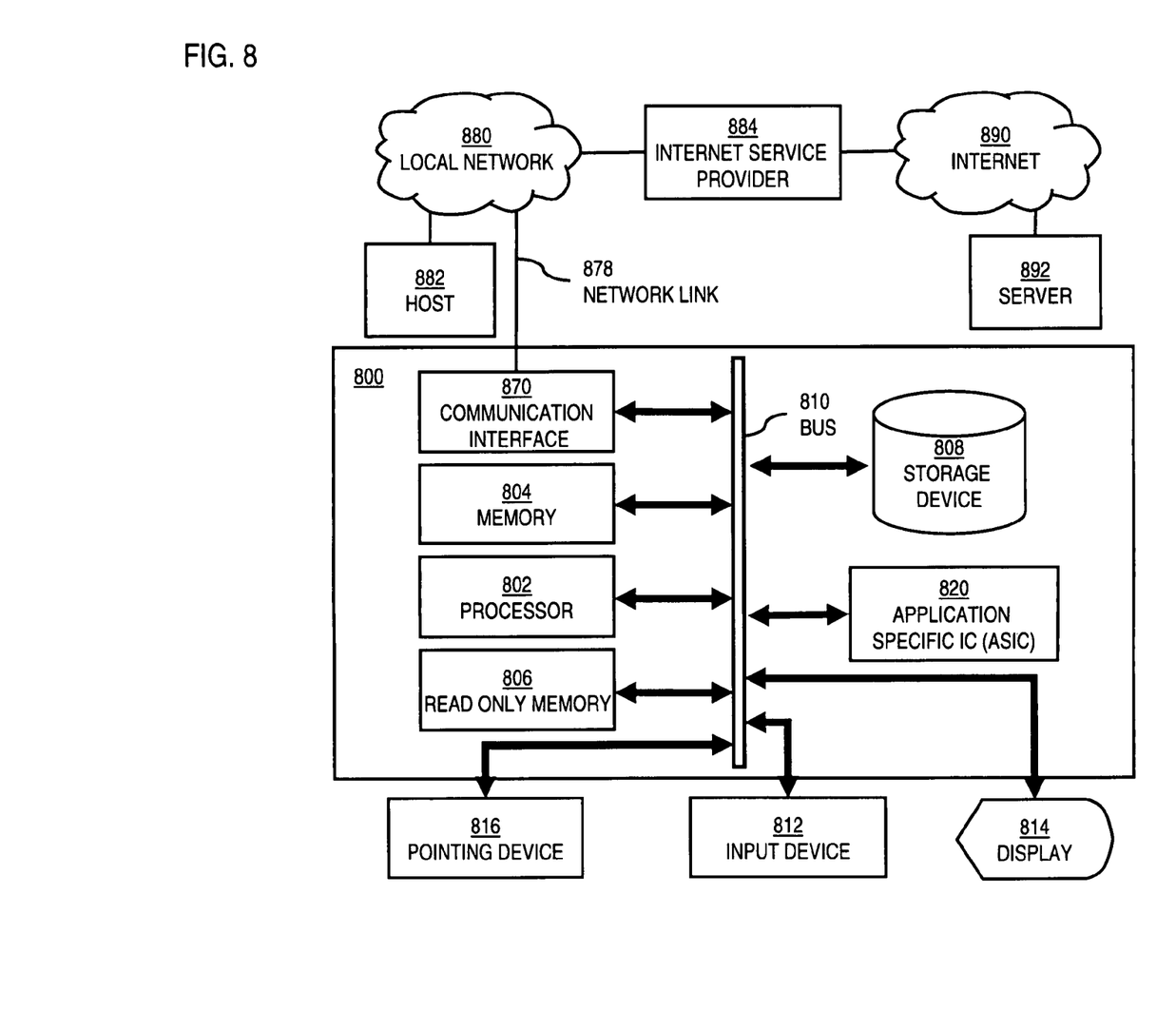
FIG. 8 is a diagram of hardware that can be used to implement an embodiment of the invention.

FIG. 8 illustrates a computer system 800 upon which an embodiment of the invention may be implemented. Computer system 800 is programmed to carry out the inventive functions described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-word signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein. The memory 905 also stores the data associated with or generated by the execution of the inventive steps.

Figure 10:
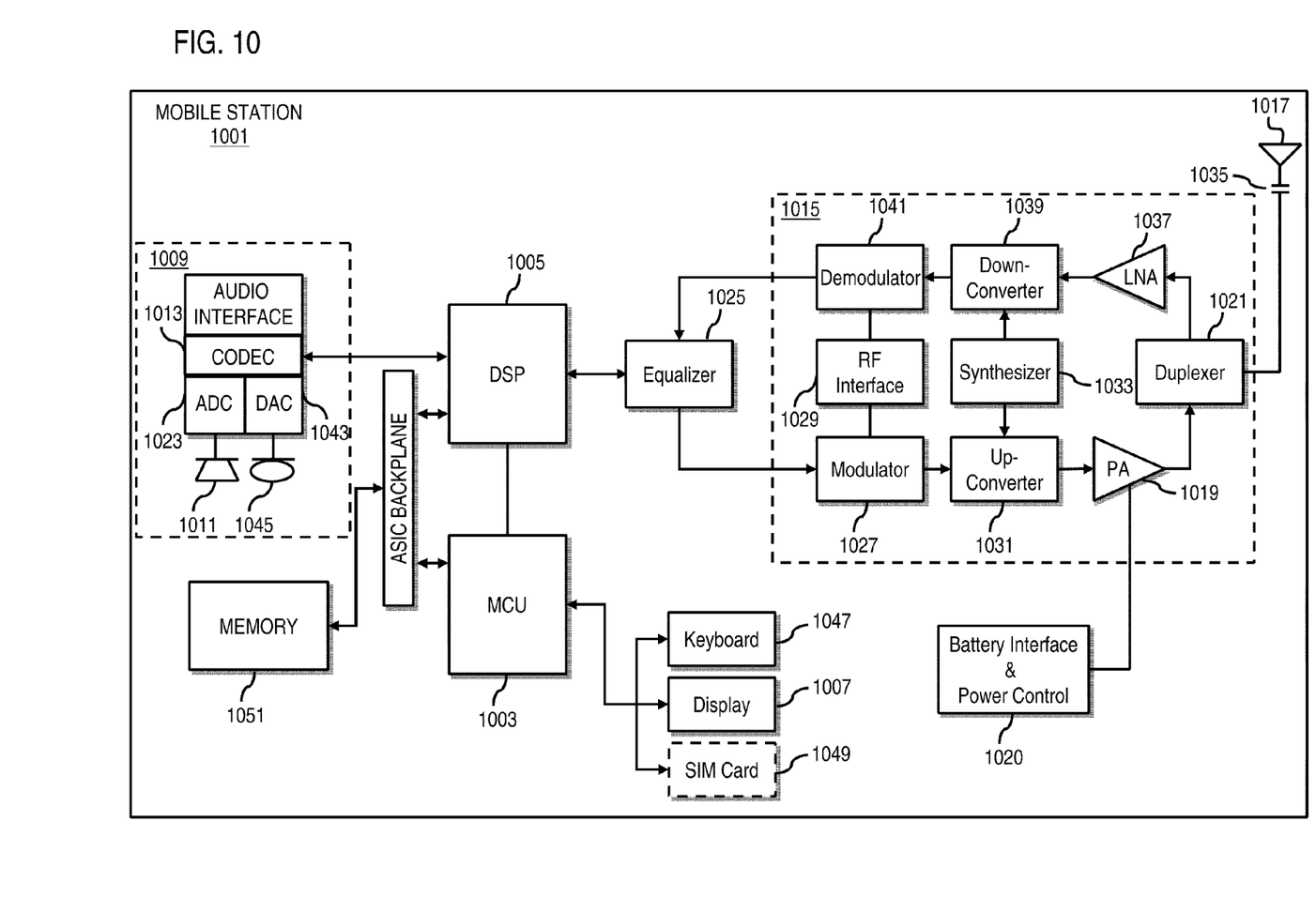
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
      determine to initiate delivery of a heavy component of advertising data to a user equipment, the advertising data including a light component;
      determine to initiate delivery of the light component to the user equipment independently of the heavy component, wherein the advertising data has been separated into the heavy component and the light component based on predetermined criteria; and
      determine to update the heavy component or the light component, wherein the light component is updated independently of the heavy component.

2. An apparatus of claim 1, wherein the delivery of the advertising data is either by pre-loading the advertising data into the user equipment prior to sale of the user equipment or by downloading the advertising data to the user equipment.

3. An apparatus of claim 2, wherein the downloading of the advertising data is configured to occur when the user equipment is connected to a local area network or when network access fees are reduced or eliminated.

4. An apparatus of claim 1, wherein the predetermined criteria include file size, frequency of change, reusability, customizability, or any combination thereof.

5. An apparatus of claim 1, wherein the advertising data includes one or more templates for compiling the heavy component and the light component into an advertisement, and wherein the advertising data is context aware, the context including location, time, or both.

6. An apparatus of claim 1, wherein the apparatus is further caused to:
   determine to initiate compilation of the heavy component and the light component into an advertisement based, at least in part, on the delivery of the light component.

7. An apparatus of claim 1, wherein the apparatus is further caused to:
   determine to initiate delivery of the updated heavy component or the updated light component to the user equipment.

8. An apparatus of claim 1, wherein the predetermined criteria include frequency of change, reusability, or any combination thereof.

9. A method comprising:
   determining to provide access for delivery of a heavy component and a light component of advertising data independently of each other, wherein the advertising data has been separated into the heavy component and the light component based on predetermined criteria; and
   determining to update the heavy component or the light component, wherein the light component is updated independently of the heavy component.

10. A method of claim 9, further comprising:
    determining to initiate the compilation of the heavy component and the light component into an advertisement based, at least in part, on the delivery of the light component.

11. A non-transitory computer-readable storage medium carrying one or more sequences of one or more instructions which, when executed by one or more processors, cause an apparatus to at least perform the following steps:
    receiving delivery of a heavy component and a light component of advertising data independently of each other, wherein the advertising data has been separated into the heavy component and the light component based on predetermined criteria; and
    receiving an updated heavy component or an updated light component of the advertising data, wherein the updated light component is received independently of the updated heavy component.

12. A non-transitory computer-readable storage medium of claim 11, wherein the delivery of the advertising data is either by pre-loading the advertising data prior to sale or by downloading the advertising data.

13. A non-transitory computer-readable storage medium of claim 11, wherein the downloading of the advertising data is configured to occur when connected to a local area network or when network access fees are reduced or eliminated.

14. A non-transitory computer-readable storage medium of claim 11, wherein the apparatus is caused to further perform:
    determining to initiate a compilation of the heavy component and the light component into an advertisement based, at least in part, on the delivery of the light component.

15. A non-transitory computer-readable storage medium of claim 14, wherein the compilation is further based on a template, a context, or both, the context including location, time, or both.

16. A non-transitory computer-readable storage medium of claim 14, wherein the apparatus is caused to further perform:
    determining to initiate recompilation of the advertisement to include the updated heavy component or the updated light component.

17. An apparatus comprising:
    at least one processor; and
    at least one memory including computer program code for one or more programs,
    the at least one memory and the computer program code configured to, with the at least one processor, cause the apparatus to perform at least the following,
       receive delivery of a heavy component and a light component of advertising data independently of each other, wherein the advertising data has been separated into the heavy component and the light component based on predetermined criteria, and the delivery of the advertising data is either by pre-loading the advertising data prior to sale or downloading the advertising data; and receive an updated heavy component or an updated light component of the advertising data, wherein the updated light component is received independently of the updated heavy component.

18. An apparatus of claim 17, wherein the apparatus is further caused to determine to initiate a compilation of the heavy component and the light component of the advertising data into an advertisement based, at least in part, on the delivery of the light component.

19. An apparatus of claim 18, the apparatus is further caused to determine to initiate recompilation of the advertisement to include the updated heavy component or the updated light component.

20. An apparatus of claim 17, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

\* \* \* \* \*